Figure 1:
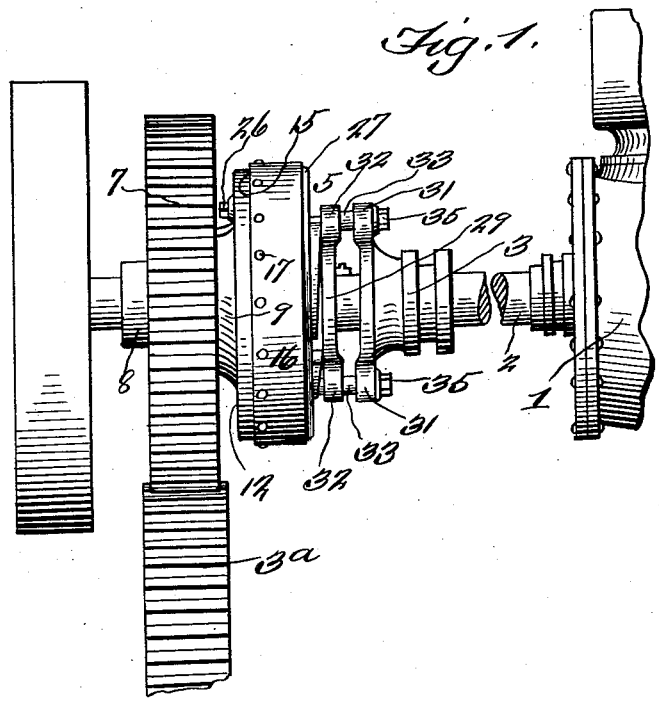

H. I. SIMMONS.
FLEXIBLE BELT COVERING.
APPLICATION FILED JUNE 15, 1912.

1,065,736.

Patented June 24, 1913.

2 SHEETS—SHEET 1.

Witnesses
Mark DeGrange,
Francis T. Boxwell

Inventor
H. I. Simmons,
By D. Swift & Co.,
his Attorneys

H. I. SIMMONS.
FLEXIBLE BELT COVERING.
APPLICATION FILED JUNE 15, 1912.

1,065,736.

Patented June 24, 1913.
2 SHEETS—SHEET 2.

Witnesses
Francis G. Boswell,
R. he Meyer.

Inventor
H. I. Simmons,
By D. Swift & Co.
Attorneys

UNITED STATES PATENT OFFICE.

HERRMANN I. SIMMONS, OF SOUTH WINDHAM, CONNECTICUT, ASSIGNOR TO THE SMITH AND WINCHESTER MANUFACTURING CO., OF SOUTH WINDHAM, CONNECTICUT.

FLEXIBLE-BELT COUPLING.

1,065,736.  Specification of Letters Patent.  Patented June 24, 1913.

Application filed June 15, 1912. Serial No. 703,902.

*To all whom it may concern:*

Be it known that I, HERRMANN I. SIMMONS, a citizen of the United States, residing at South Windham, in the county of Windham and State of Connecticut, have invented a new and useful Flexible-Belt Coupling; and I do hereby declare the following to be a full, clear, and exact description of the invention, such as will enable others skilled in the art to which it appertains to make and use the same.

This invention relates to a new and useful flexible shaft coupling, adapted principally for use for coupling the shafts of an engine and an electric motor.

The principal object of the invention is to provide a device of this nature, whereby two shafts, that may be slightly out of alinement, may be coupled.

It is a further object of the invention to provide two members, one secured to one end of each shaft, and having inter-receiving portions provided with claws, about which a flexible belt may be inter-laced, thereby producing a novel and practical flexible shaft coupling.

The invention comprises further features and combination of parts, as hereinafter set forth, shown in the drawings and claimed.

Figure 4:
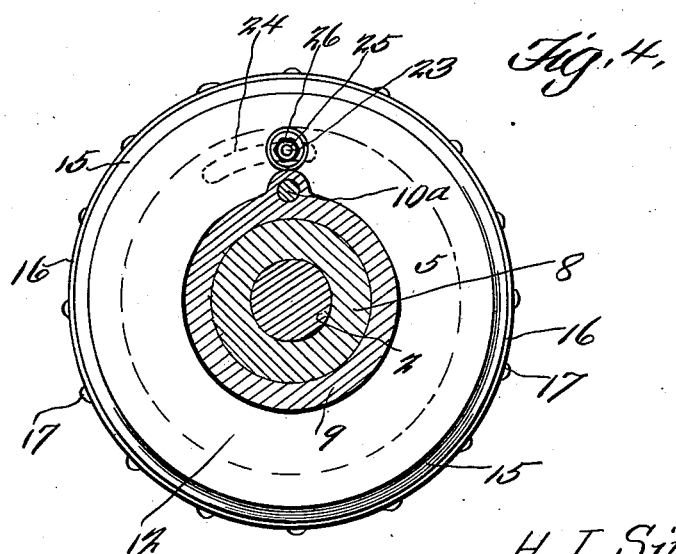
Figure 2:
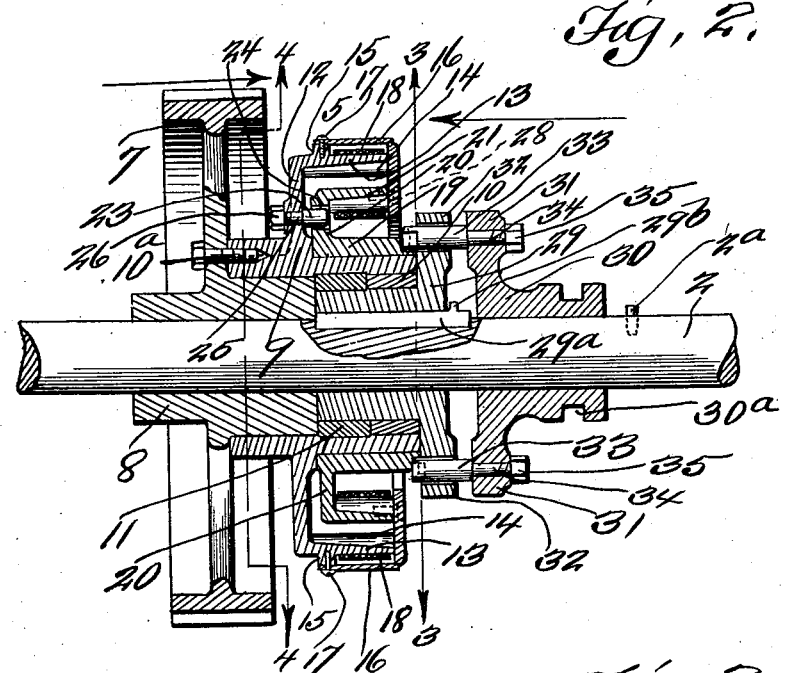
Figure 3:
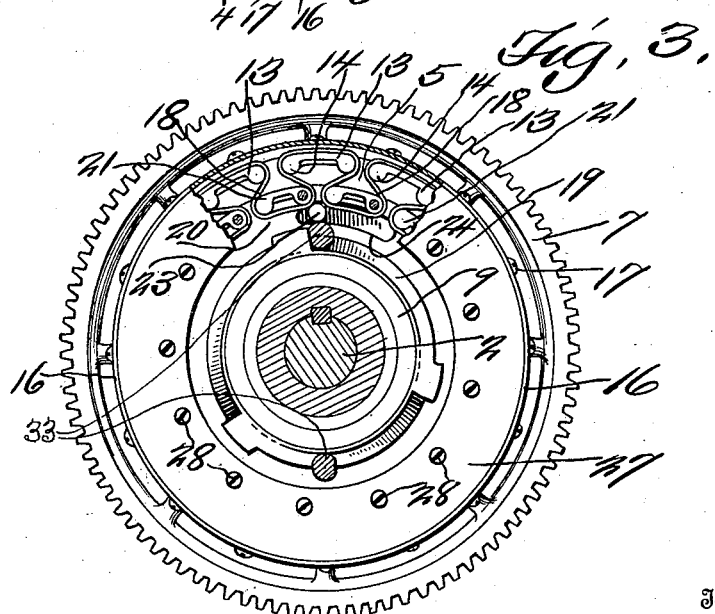

In the drawings:—Figure 1 is a view in side elevation of a portion of an engine, and portion of a gear 3ª of a motor or the like, showing the invention applied thereto. Fig. 2 is a vertical sectional view through the flexible shaft coupling. Fig. 3 is a sectional view on line 3—3 of Fig. 2. Fig. 4 is a sectional view on line 4—4 of Fig. 2.

Referring more particularly to the drawings 1 designates an engine having a drive shaft 2, while 3ª denotes a portion of a gear of an electric motor or other device or machinery, to be coupled to the engine 1, through the medium of the flexible shaft coupling device 5. In the figures of the drawings, a clutch gear 7 is loosely mounted on the shaft 2, and to the hub portion 8 of this clutch gear, a sleeve member 9 is fitted, the same being fixed to rotate with the clutch gear by means of the bolt 10ª, which penetrates a portion of the clutch gear, and is threaded into the sleeve 9. Fitting within the sleeve 9 are the rings 10 and 11. The sleeve 9 is provided with an annular flange 12, from the outer portion of which and extending laterally therefrom is a series of claws 13, each of which is provided with cylindrical portions 14 at each end. The claws 13 are separated from one another, as shown, in order that the flexible belt may be inter-laced from one to the other. At the point where the claws 13 are cast to the annular flange 12 a bead or annular raised portion 15 is provided, to which a cover of sheet metal 16 is secured, by means of the screws 17. This cover is designed for the purpose of preventing an attendant or other person from getting his hands entangled in the spaces between the flexible belt 18.

Fitting the outer circumference of the sleeve 9 and adjacent the annular flange 12 is a sleeve 19, which is provided with an annular flange 20, which corresponds substantially with the flange 12, but is not as wide. Projecting laterally from the flange 20 is a series of spaced apart claws 21, which are similar to the claws 13, and partially about which the belt 18 inter-laces, thereby flexibly coupling the sleeves 9 and 19 together. In case the flexible belt becomes broken, or otherwise incapable of performing its work, a safety device is provided. This safety device comprises a lug or pin 23, which extends into a slot 24 of the flange 20 of sleeve 19. The slot 24 is curved on the arc of a circle, using the center of the shaft 2 as the center. The lug or pin 23 is provided with an extension 25, which passes through the flange 12, and to which a nut 26 is threaded, thereby securing the pin or lug firmly in position. This pin or lug 23, it will be seen, has a limited movement in the slot 24, and in case the flexible belt 18 should become broken, or otherwise incapable, the pin 23 would contact with one end or the other of the slot 24, it depending on which direction the driven shaft 2 is rotated. The said shaft 2 will rotate in this manner, until the engine is stopped, long enough to permit the belt to be repaired, or a new one installed.

Secured to the claws 21 is an annular ring 27, by means of the screws 28. This annular ring 27 extends beyond the outer portions of the claws 13, and below the inner portion of the claws 21, as shown, in order to prevent displacement of the flexible belt.

The members 29 and 30 are provided with projections 31 and 32. The member 29 is keyed to rotate with the shaft 2, by means of the key 29ª, and is adapted to move or rotate within the rings 10 and 11. The member 30 is loosely mounted upon the shaft 2, and is adapted to slide thereon, and the pins 33 passing through openings of the projections 32 act as guide for the member 30. This member 30 is limited in its movement by the lug 2ª of the shaft 2. Any suitable lever (not shown) having suitable connections (not shown) with the annular groove 30ª of the member 30 may be provided, for shifting the member 30. The pins 33 are provided with reduced portions 34, which extend through the projections 31, and are provided with nuts 35, in order to secure the pins in place. The ends of the pins are constructed with flat portions which are designed to contact with one or another of the shoulders of sleeve 19, when the member 30 is shifted in the direction of the member 29, so as to cause the sleeve 19 to rotate with the shaft 2, and being that the flexible belt 18 inter-laces in and out of the claws 13 and 21, the sleeves 9 will also be rotated with the shaft 2 and sleeve 19. When the sleeve 9 is thus rotated, the clutch gear is in turn rotated, because of the bolt 10ª which passes through the clutch gear and into the sleeve 9. In this manner the clutch gear 7 transmits power to the gear 3ª of any suitable machinery (not shown). When the member 30 is shifted in contact with the lug 2ª, the parts 19, 9 and 7 are not rotated with the shaft 2. The lug 29ᵇ of the key 29ª limits the rearward movement of the member 29. The claws 13 may be secured in any suitable manner to the flange 12, integrally or otherwise.

From the foregoing it will be noted, there has been devised a novel and efficient flexible or elastic belt shaft coupling, and one which has been found particularly desirable and practical.

The invention having been set forth, what is claimed as new and useful is:—

1. In combination, a revoluble shaft, a driven member loosely journaled thereon, a sleeve element fixed on the driven member, a second sleeve element constituting a driving member loosely sleeved upon the first sleeve element, means for connecting the second sleeve element to the revoluble shaft, the first sleeve element constituting a bearing extending axially with said shaft for the second sleeve element, the sleeve elements having adjacent flanges, each terminating in a series of spaced apart broad claws, the ends of each of which terminate in rounded portions, said claws and rounded portions extending axially with said shaft, one series being arranged within the other, a flexible belt interlaced between the claws of both series to cause the two sleeve elements to rotate together, an annular ring carried by one series of claws and adapted to overlap the other series, to retain the belt interlaced upon the claws, an annular band cover secured on the flange of the first sleeve element to protect the flexible belt, the flange of the second sleeve element having a segmental slot, and a pin carried by the flange of the first sleeve element to extend into said slot, thereby constituting a safety device between the sleeve elements, in the event the flexible belt becomes incapable of performing its work.

2. In combination, a revoluble shaft, a driven member loosely journaled thereon, a sleeve element fixed on the driven member, a second sleeve element constituting a driving member loosely sleeved upon the first sleeve element, means for connecting the second sleeve element to the revoluble shaft, the first sleeve element constituting a bearing extending axially with said shaft for the second sleeve element, the sleeve elements having adjacent flanges, each terminating in a series of spaced apart claws extending axially with said shaft, one series being arranged within the other, a flexible belt interlaced between the claws of both series to cause the two sleeve elements to rotate together, a ring carried by one series of claws and adapted to overlap the other series, to retain the belt interlaced upon the claws, an annular band cover secured on the first sleeve element to protect the flexible belt, the flange of the second sleeve element having a segmental slot, and a pin carried by the flange of the first sleeve element to extend into said slot, thereby constituting a safety device between the sleeve elements in the event the flexible belt becomes incapable of performing its work.

3. In combination, a pair of sleeved elements, one sleeved within and acting as a bearing for the other, one constituting a driving member, while the other acts as the driven member, said elements having adjacent flanges, each terminating in a series of spaced apart claws, one series being arranged within the other and overhanging the sleeved portions of said elements, a flexible belt interlaced between the claws of both series to cause the two sleeved elements to rotate together, a ring carried by one series of claws and adapted to overlap the other series to retain the belt interlaced upon the claws, an annular band cover secured on the driven element, arching over the belt and engaging said ring to protect the belt, the flange of the driving element having a segmental slot, and a pin carried by the flange of the driven element to extend into said slot, thereby constituting a safety device between the sleeve elements, in the event the flexible belt becomes incapable of performing its work.

4. In combination, a pair of sleeved elements, one sleeved within and acting as a bearing for the other, one constituting a driving member, while the other acts as the driven member, said elements having adjacent flanges, each terminating in a series of spaced apart broad claws, the ends of each of which terminate in rounded portions, said claws and rounded portions extending in surfaces concentric with the sleeve elements, one series being arranged within the other and overhanging the sleeved portions of said elements, a flexible belt interlaced between the claws of both series to cause the two sleeved elements to rotate together, a ring carried by one series of claws and adapted to overlap the other series to retain the belt interlaced upon the claws, an annular band cover secured on the flange of the driven element and arching over the belt and engaging said ring to protect the belt, the flange of the driving element having a segmental slot, and a pin carried by the flange of the driven element to extend into said slot, thereby constituting a safety device between the sleeve elements, in the event the flexible belt becomes incapable of performing its work, and means having connections with the driving element for driving the same.

In testimony whereof I have signed my name to this specification in the presence of two subscribing witnesses.

HERRMANN I. SIMMONS.

Witnesses:
FRANK B. LATHROP,
E. LAPIERRE.

Copies of this patent may be obtained for five cents each, by addressing the "Commissioner of Patents, Washington, D. C."